(12) United States Patent
Wang

(10) Patent No.: US 9,977,410 B2
(45) Date of Patent: May 22, 2018

(54) CONTROL SYSTEM AND METHOD THEREOF

(71) Applicant: LEADOT INNOVATION, INC., Kaohsiung (TW)

(72) Inventor: Justin Wang, Taipei (TW)

(73) Assignee: LEADOT INNOVATION, INC., Kaohsiung (TW)

( * ) Notice: Subject to any disclaimer, the term of this patent is extended or adjusted under 35 U.S.C. 154(b) by 326 days.

(21) Appl. No.: 14/709,487

(22) Filed: May 12, 2015

(65) Prior Publication Data

US 2015/0378324 A1 Dec. 31, 2015

(30) Foreign Application Priority Data

Jun. 25, 2014 (TW) .............................. 103121950 A

(51) Int. Cl.
| | | |
|---|---|---|
| G05B 11/01 | (2006.01) | |
| G08C 17/02 | (2006.01) | |
| H04B 5/02 | (2006.01) | |
| H04N 5/33 | (2006.01) | |
| H04B 5/00 | (2006.01) | |
| H04R 3/00 | (2006.01) | |
| H04R 1/10 | (2006.01) | |
| G05B 19/042 | (2006.01) | |

(52) U.S. Cl.
CPC .............. *G05B 11/01* (2013.01); *G05B 19/042* (2013.01); *G08C 17/02* (2013.01); *H04B 5/0043* (2013.01); *H04B 5/02* (2013.01); *H04N 5/33* (2013.01); *H04R 1/1041* (2013.01); *H04R 3/00* (2013.01); *G05B 2219/25236* (2013.01); *G05B 2219/25279* (2013.01); *H04R 2499/11* (2013.01); *Y02D 70/166* (2018.01); *Y02D 70/42* (2018.01)

(58) Field of Classification Search
CPC .... G05B 11/01; G05B 19/042; H04R 1/1041; H04R 3/00; H04R 2499/11; H04N 5/33; H04B 5/02; H04B 5/0043; Y02D 70/166; Y02D 70/42; G08C 17/02
USPC .......................................................... 700/11
See application file for complete search history.

(56) References Cited

U.S. PATENT DOCUMENTS

| | | | | |
|---|---|---|---|---|
| 4,253,628 A | * | 3/1981 | Marek ................... | B64D 17/22 244/151 A |
| 6,346,891 B1 | * | 2/2002 | Feinleib ................ | G08C 17/02 340/12.3 |
| 8,493,181 B2 | * | 7/2013 | Kitayoshi .......... | G06K 19/0713 340/10.1 |

(Continued)

FOREIGN PATENT DOCUMENTS

| | | |
|---|---|---|
| CN | 101354570 A | 1/2009 |
| CN | 101354571 A | 1/2009 |

(Continued)

*Primary Examiner* — Crystal J Barnes-Bullock
(74) *Attorney, Agent, or Firm* — Winston Hsu

(57) ABSTRACT

In a control system, when a sensor receives a sensing signal, the sensor sends a notice signal to a preparatory starting device so that the preparatory starting device performs a starting operation. After the starting operation is finished, the preparatory starting device sends an operation command and/or operation power to a starting unit. The starting unit would not pass the operation command and/or the operation power to a receiving end until receiving a control signal.

12 Claims, 8 Drawing Sheets

(56) References Cited

U.S. PATENT DOCUMENTS

| | | | | |
|---|---|---|---|---|
| 8,995,689 B2* | 3/2015 | Sander | ............... | H04M 1/05 367/137 |
| 9,680,980 B2* | 6/2017 | Sander | ............... | H04M 1/6058 |
| 2001/0028297 A1* | 10/2001 | Hara | ............... | B60R 25/246 340/5.62 |
| 2009/0163226 A1* | 6/2009 | Karkaria | ............... | G06F 1/3203 455/456.1 |
| 2010/0089109 A1* | 4/2010 | Bliding | ............... | E05B 17/0062 70/280 |
| 2010/0315244 A1* | 12/2010 | Tokhtuev | ............... | G08B 21/245 340/603 |
| 2011/0298597 A1* | 12/2011 | Kaihori | ............... | G08C 17/02 340/13.25 |
| 2011/0304208 A1 | 12/2011 | Lee | | |
| 2012/0038778 A1* | 2/2012 | Klager | ............... | H04N 5/33 348/166 |

FOREIGN PATENT DOCUMENTS

| | | | |
|---|---|---|---|
| JP | H07266842 | A | 10/1995 |
| JP | 2006520901 | A | 9/2006 |
| JP | 20097801 | A | 1/2009 |
| JP | 2011256675 | A | 12/2011 |
| TW | 197814 | | 1/1993 |
| TW | M370726 | U1 | 12/2009 |
| TW | 201145005 | A1 | 12/2011 |
| TW | M419959 | U1 | 1/2012 |
| WO | 2004085984 | A1 | 10/2004 |
| WO | 2014088333 | A1 | 6/2014 |

\* cited by examiner

CONTROL SYSTEM AND METHOD THEREOF

BACKGROUND OF THE INVENTION

1. Field of the Invention

The present application relates to a control system and method thereof, and more particularly, a control system and a method thereof for performing a starting operation before receiving a control signal.

2. Description of the Prior Art

The control system of prior art is started after receiving a control signal. Since a time interval is required from when the control system has just started, to when the starting operation is finished for the control system to enter an operation mode, a user often needs to wait for the control system to execute an expected operation. FIG. 1 illustrates a time diagram corresponding to a control system of prior art. When the control system receives a control signal $S_{control}$ (sent by a user for example) at time tx, the starting operation of the control system is completed at time ty. Before time ty, the control system is allowed to perform a functional operation since it is not started appropriately. Hence, when a user sends the control signal $S_{control}$, the user needs to wait a delay time Tdelay1 for the control system to execute the functional operation. The mentioned delay time $T_{delay1}$ may vary with the type of the control system to be several seconds or even tens of seconds. Such a long delay time may lead to bad user experience. When the control system is of an industrial machine used in an industrial environment, the long delay time $T_{delay1}$ may make it difficult for the user to control the control system smoothly and even make the user misjudge the status of the control system so that the risk of industrial accident is increased.

SUMMARY OF THE INVENTION

An embodiment of the present application discloses a control system. The control system comprises a sensor, a preparatory starting device, a starting unit and a receiving end. The sensor is configured to receive a sensing signal and send a notice signal. The preparatory starting device is configured to receive the notice signal, perform a starting operation and send an operation command and/or an operation power. The starting unit is coupled to the preparatory starting device and configured to receive a control signal, and receive and send the operation command and/or the operation power. The receiving end is coupled to the starting device, and configured to receive the operation command and/or the operation power and perform a receiving end operation. After the sensor receives the sensing signal, the sensor sends the notice signal to the preparatory starting device, the preparatory starting device performs the starting operation, the preparatory starting device sends the operation command and/or the operation power to the starting unit, the starting unit sends the operation command and/or the operation power to the receiving end for the receiving end to perform the receiving end operation when the starting unit receives the control signal.

Another embodiment of the present application discloses a method for controlling a control system. The control system comprises a sensor, a preparatory starting device, a starting unit and a receiving end. The method comprises the sensor sending a notice signal to the preparatory starting device when the sensor receives a sensing signal; the preparatory starting device performing a starting operation when the preparatory starting device receives the notice signal; the preparatory starting device sending an operation command and/or an operation power to the starting unit when the preparatory starting device finishes performing the starting operation; the starting unit sending the operation command and/or the operation power to the receiving end for the receiving end to perform a receiving end operation when the starting unit receives a control signal.

Another embodiment of the present application discloses a method for controlling a control system. The control system comprises a sensor, a preparatory starting device, a starting unit and a receiving end. The method comprises the sensor sending a notice signal to the preparatory starting device when the sensor receives a sensing signal; the preparatory starting device performing a starting operation when the preparatory starting device receives the notice signal; the preparatory starting device sending an operation command and/or an operation power to the starting unit when the preparatory starting device finishes performing the starting operation; the starting unit informing the preparatory starting device to stop sending the operation command and/or the operation power to the starting unit when the starting unit does not receive a control signal after a predetermined time interval.

By using the control system and method thereof disclosed by the present application, the delay time causing a long waiting time may be shortened so that users' experience and convenience are improved.

These and other objectives of the present invention will no doubt become obvious to those of ordinary skill in the art after reading the following detailed description of the preferred embodiment that is illustrated in the various figures and drawings.

DETAILED DESCRIPTION

In the following description, when a plurality of cases are mentioned and connected with a grammatical conjunction "and/or", that means one or more of the cases connected by "and/or" may occur. For example, when mentioning "A and/or B", that may mean a case of only A, another case of only B, or another case of both A and B. Another example is, when mentioning "receiving an operation command $S_{operation}$ and/or an operation power $P_{operation}$", that may mean one of the three cases: "receiving an operation command $S_{operation}$", "receiving an operation power $P_{operation}$", and "receiving an operation command $S_{operation}$ and also receiving an operation power $P_{operation}$". When the grammatical conjunction "and/or" is used in the following description, the usage is as explained above, and further explanation is omitted for simplicity.

Figure 2:
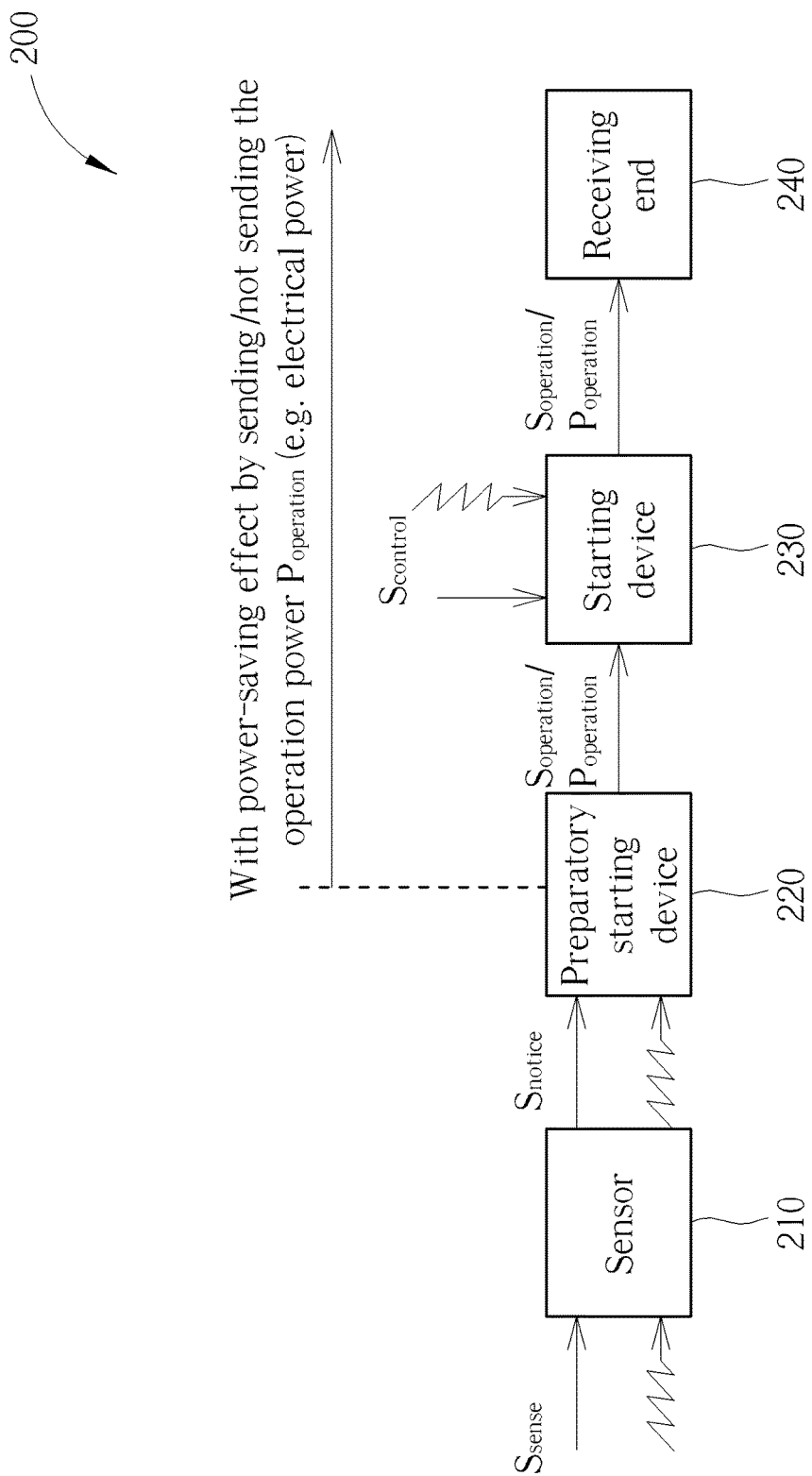
FIG. 2 illustrates a control system according to an embodiment of the present application.

FIG. 2 illustrates a control system 200 according to an embodiment of the present application. The control system 200 comprises a sensor 210, a preparatory starting device 220, a starting unit 230 and a receiving end 240. The sensor 210 is configured to receive a sensing signal $S_{sense}$ and send a notice signal $S_{notice}$. The preparatory starting device 220 is configured to receive the notice signal $S_{notice}$, perform a starting operation and send an operation command $S_{operation}$ and/or an operation power $P_{operation}$. The starting unit 230 is coupled to the preparatory starting device 220 and configured to receive a control signal $S_{control}$, and receive and send the operation command $S_{operation}$ and/or the operation power $P_{operation}$. The receiving end 240 is coupled to the starting device 230, and configured to receive the operation command $S_{operation}$ and/or the operation power $P_{operation}$ and perform a receiving end operation. After the sensor 210 receives the sensing signal $S_{sense}$, the sensor 210 sends the notice signal $S_{notice}$ to the preparatory starting device 220, the preparatory starting device 220 performs the starting operation, the preparatory starting device 220 sends the operation command $S_{operation}$ and/or the operation power $P_{operation}$ to the starting unit 230 when the preparatory starting device 220 finishes performing the starting operation, the starting unit 230 sends the operation command $S_{operation}$ and/or the operation power $P_{operation}$ to the receiving end 240 for the receiving end 240 to perform the receiving end operation when the starting unit 230 receives the control signal $S_{control}$.

Figure 3:
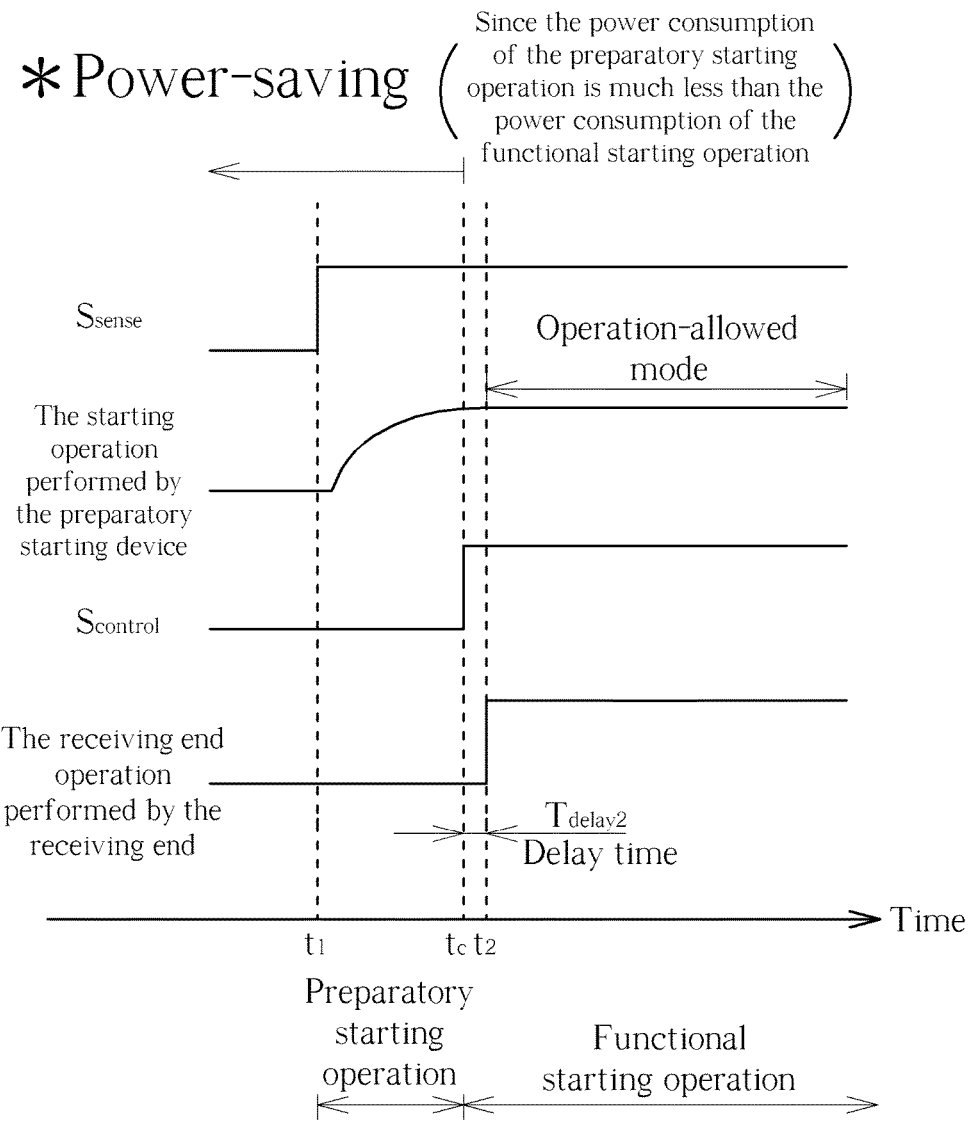
FIG. 3 illustrates a time diagram corresponding to the control system shown in FIG. 2.

FIG. 3 illustrates a time diagram corresponding to the control system 200 shown in FIG. 2. Take an automatic door control system for example. When a user walks into a first area being within a longer distance from the automatic door control system, the preparatory starting device 220 performs a starting operation in advance. When the user further walks into a second area being within a shorter distance from the automatic door control system, since the preparatory starting device 220 has finished the starting operation, a delay time for the receiving end 240 (e.g. a door sheet) to perform a receiving end operation (e.g. the opening of an automatic door) is shortened so that a waiting time of the user is reduced and a power consumption of the control system 200 caused by a long standby time is also reduced. Details of the said operation are described as follow.

According to an embodiment relating to the automatic door control system, the sensor 210 may be an infrared (IR) sensor for detecting a longer sensing distance such as 5 meters. When a human body moves within 5 meters from the sensor 210, the sensor 210 receives a sensing signal $S_{sense}$ at a time t1. The sensing signal $S_{sense}$ may be an infrared signal with 10 micrometer wavelength radiated from a human body with normal body temperature. After receiving the sensing signal $S_{sense}$, the sensor 210 sends the notice signal $S_{notice}$ to the preparatory starting device 220 that may be a composite device including an electrical starting circuit and a direct current motor. The preparatory starting device 220 then starts performing a starting operation. The starting operation may include, for example, controlling the electrical starting circuit to enter an operating mode from a non-operating mode, and controlling the direct current motor to begin operating to work at a predetermined speed (e.g. 2500 revolutions per minute). After the starting operation is done at a time t2, the preparatory starting device 220 may send the operation command $S_{operation}$ and/or the operation power $P_{operation}$ to the starting unit 230. For example, the operation command $S_{operation}$ may be a door-opening instruction, and the operation power $P_{operation}$ may be electrical power and mechanical power.

The condition for operating the starting unit 230 is that the starting unit 230 sends the operation command $S_{operation}$ and/or the operation power $P_{operation}$ to the receiving end 240 for the receiving end 240 to perform the receiving end operation when the starting unit 230 receives the control signal $S_{control}$; and the starting unit 230 does not send the operation command $S_{operation}$ and/or the operation power $P_{operation}$ to the receiving end 240 so that the receiving end 240 does not perform the receiving end operation when the starting unit 230 does not receive the control signal $S_{control}$.

According to the embodiment of the present application relating to automatic door, the starting unit 230 may an infrared sensor for detecting a shorter sensing distance such as 50 centimeters. When a human body further moves within 50 centimeters from the automatic door control system (that is the control system 200), the starting unit 230 receives the control signal $S_{control}$ correspondingly. Since the starting unit 230 receives the control signal $S_{control}$, the starting unit 230 sends the mentioned operation command $S_{operation}$ (e.g. the door-opening instruction) and/or the operation power $P_{operation}$ (e.g. electrical power and mechanical power) to the receiving end 240 for the receiving end 240 to perform the receiving end operation (e.g. opening the automatic door).

Figure 1:
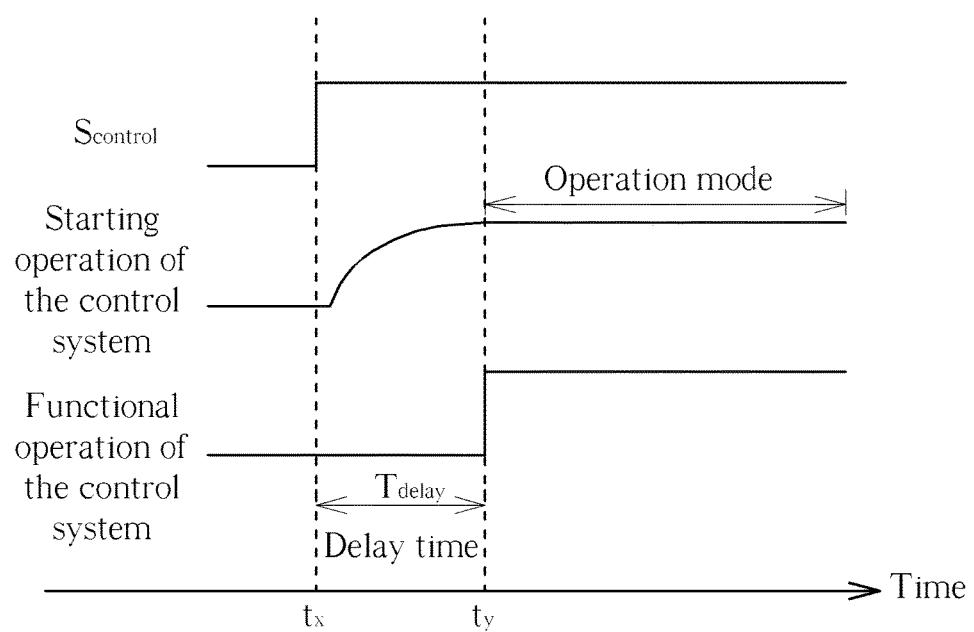
FIG. 1 illustrates a time diagram corresponding to a control system of prior art.

The short propagation delay caused by the transmission paths and the starting unit 230 while propagating the operation command $S_{operation}$ and/or the operation power $P_{operation}$ from the preparatory starting device 220 to the receiving end 240 through the starting unit 230 may be neglected, thus the preparatory starting device 220 finishes the starting operation at the time t2 to send the operation command $S_{operation}$ and/or the operation power $P_{operation}$ to the receiving end 240, and the receiving end 240 receives the operation command $S_{operation}$ and/or the operation power $P_{operation}$ at the time t2 for performing the receiving end operation because the starting unit receives the control signal $S_{control}$. The preparatory starting device 220 enters an operation-allowed mode (as shown in FIG. 3) at the time t2. As shown in FIG. 3, because the starting unit 230 receives the control signal $S_{control}$ at a time tc, the operation command $S_{operation}$ and/or the operation power $P_{operation}$ is allowed to be sent from the starting unit 230 to the receiving end 240 at the time t2 for the receiving end 240 to perform the receiving end operation at the time t2. Therefore, a time interval from the control system 200 receiving the control signal $S_{control}$ to the control system 200 performing the receiving end operation is the time interval from the time tc to the time t2, that is the delay time $T_{delay2}$ shown in FIG. 3. The delay time $T_{delay2}$ is greatly reduced by comparing with the delay time Tdelay1 shown in FIG. 1. Take the said embodiment relating to automatic door control system for example, the delay time Tdelay1 shown in FIG. 1 may be 2 seconds, but the delay time $T_{delay2}$ shown in FIG. 3 may be merely 0.2 second. By using the control system 200 shown in FIG. 2 and FIG. 3, when a user moves into an area within 50 centimeters from the automatic door control system at the time tc, the user may merely wait the delay time $T_{delay2}$ (e.g. 0.2 second) for the receiving end 240 to perform the receiving end operation (e.g. opening the automatic door). Thus, comparing with the long waiting time that is the delay time Tdelay1 (e.g. 2 seconds) of the prior art shown in FIG. 1, user experience is greatly improved by using the control system according to an embodiment of the present application. This is because the sensor 210 and the preparatory starting device 220 perform a preparatory starting operation in advance. In general, most power is consumed when a control system operates a functional operation such as rotating a shaft of a fishery machine or opening an automatic door sheet. As shown in FIG. 2 and FIG. 3, the control system according to an embodiment of the present application does not send the operation power $P_{operation}$ (e.g. electrical power) to the starting unit 230 without receiving the sensing signal $S_{sense}$, and the control system does not send the operation power $P_{operation}$ to the receiving end 240 without receiving the control signal $S_{control}$, either. The control system disclosed by the present application has better power-saving effect than the control system of prior art since the control system of prior art keeps providing operation power. According to an embodiment of the present application, when receiving the sensing signal $S_{sense}$ (e.g. a user walking within 5 meters from an automatic door), the preparatory starting device 220 of the control system 200 performs the preparatory starting operation so as to generate and send the operation command $S_{operation}$ and/or the operation power $P_{operation}$, but in the control system 200, the operation command $S_{operation}$ and/or the operation power $P_{operation}$ is sent to the receiving end 240 to perform a functional starting operation for the system 200 to enter the operation-allowed mode only when receiving the control signal $S_{control}$. Since the preparatory starting operation consumes much less power than the functional starting operation, the control system 200 has good power-saving performance before performing the functional starting operation.

Figure 4:
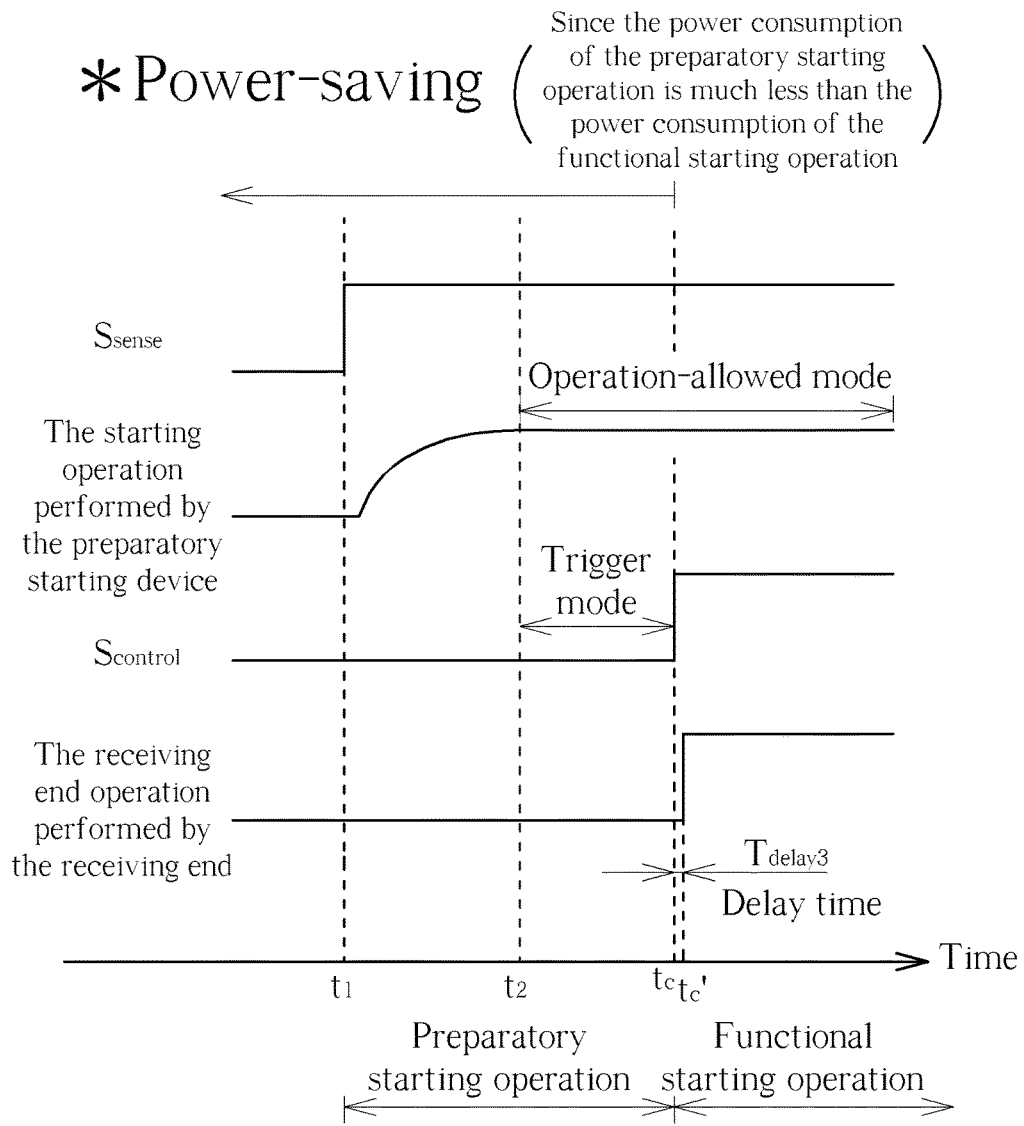
FIG. 4 illustrates another time diagram corresponding to the control system shown in FIG. 2.

FIG. 4 illustrates another time diagram corresponding to the control system 200 shown in FIG. 2. Unlike FIG. 3, in FIG. 4, a time tc (at which the starting unit 230 receives the control signal $S_{control}$) is after a time t2 (at which time the preparatory starting device 220 finishes the starting operation). According to the embodiment shown in FIG. 4, when the control system 200 enters an operation-allowed mode without receiving the control signal $S_{control}$, the control system 200 is in a trigger mode. During the trigger mode, when the control system 200 receives the control signal $S_{control}$, the receiving end 240 may perform the receiving end operation in a very short delay time. Since the preparatory starting device 220 finishes the starting operation at the time t2, the control system 200 enters the operation-allowed mode at the time t2. Since the propagation delay caused by the transmission paths and the starting unit 230 may be treated as a very short delay (e.g. 0.01 second), the receiving end 240 may perform the receiving end operation at a time tc' corresponding to the control signal $S_{control}$ received by the starting unit 230 at the time tc. Hence, according to an embodiment of the present application, if the time tc (at which time the starting unit 230 receives the control signal $S_{control}$) is after a time t2 (at which time the preparatory starting device 220 finishes the starting operation), a user merely needs to wait a very short time which is a delay time $T_{delay3}$ shown in FIG. 4. Take an automatic door control system as an example, the delay time $T_{delay3}$ may be as short as 0.01 second so that a user hardly feels the delay time. Similar to the embodiment shown in FIG. 3, the control system 200 begins performing a preparatory starting operation when receiving the sensing signal $S_{sense}$ (e.g. at the time t1) but only performs a functional starting operation when receiving the control signal $S_{control}$ (e.g. at the time tc). Since the preparatory starting operation consumes much less power than the functional starting operation, the control system 200 has good power-saving performance when performing the preparatory starting operation.

Figure 5:
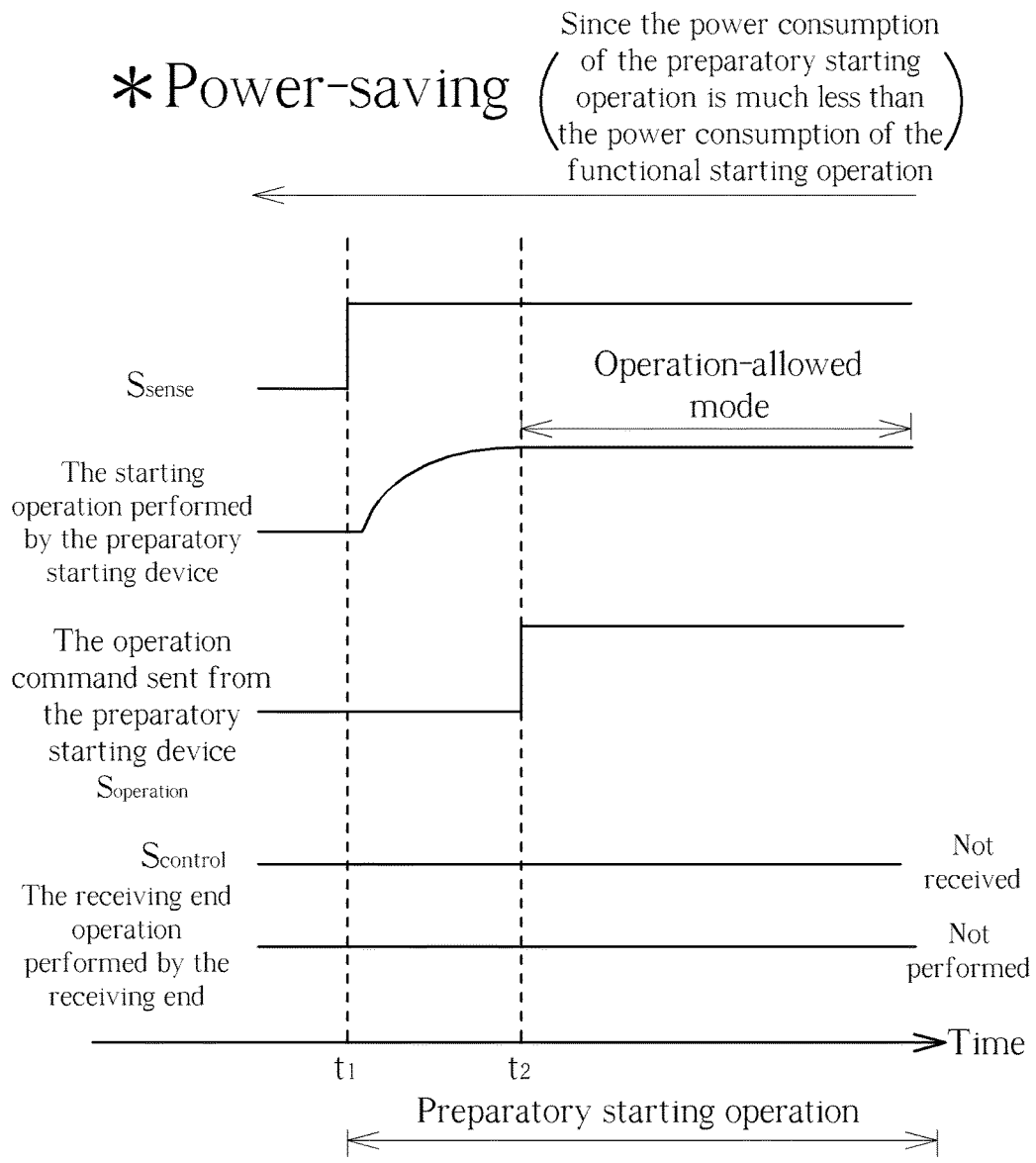
FIG. 5 illustrates another time diagram corresponding to the control system shown in FIG. 2.

FIG. 5 illustrates another time diagram corresponding to the control system 200 shown in FIG. 2. Unlike the time diagrams shown in FIG. 3 and FIG. 4, according to an embodiment corresponding to the time diagram shown in FIG. 5, the starting unit 230 of the control system 200 does not receive the control signal $S_{control}$. Hence, although the sensor 210 receives a sensing signal $S_{sense}$ at a time t1 and the preparatory starting device 220 finishes performing the starting operation at a time t2 so that the control system 200 enters an operation-allowed mode and an operation command $S_{operation}$ is sent at the time t2, the receiving end 230 does not perform the receiving end operation because the receiving end 230 does not receive the control signal $S_{control}$.

Figure 6:
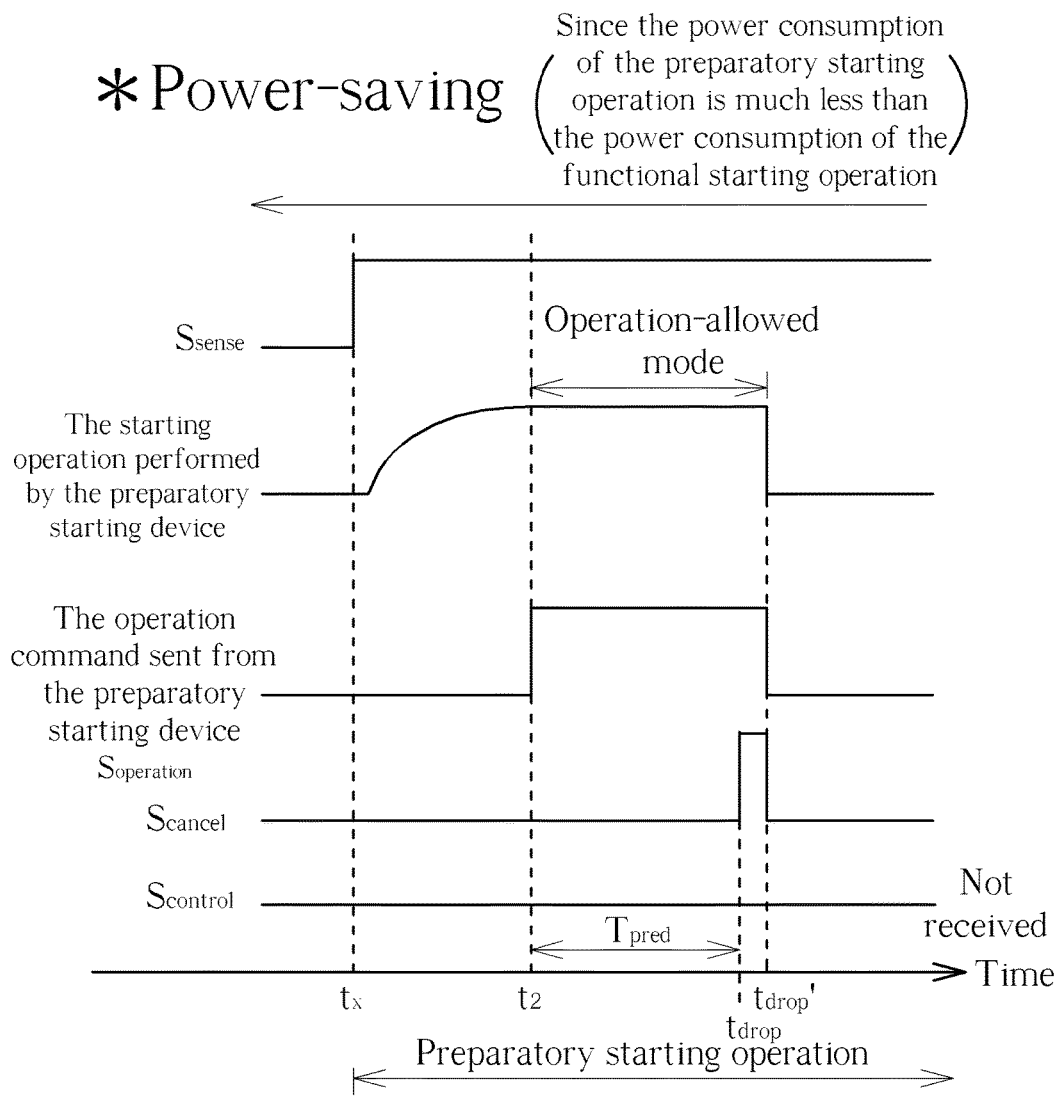
FIG. 6 illustrates another time diagram corresponding to the control system shown in FIG. 2.

FIG. 6 illustrates another time diagram corresponding to the control system 200 shown in FIG. 2. Similar to the time diagram shown in FIG. 5, the starting unit 230 of the control system 200 corresponding to an embodiment shown in FIG. 6 does not receive the control signal $S_{control}$. However, according to the embodiment shown in FIG. 6, the starting unit 230 further informs the preparatory starting device 220 to stop sending the operation command $S_{operation}$ and/or the operation power $P_{operation}$ to the starting unit 230 when the starting unit 230 does not receive the control signal $S_{control}$ after a predetermined time interval $T_{pred}$. In FIG. 6, only the operation command $S_{operation}$ is shown for representing the operation command $S_{operation}$ and/or the operation power $P_{operation}$ for simplicity. In FIG. 6, the sensor 210 receives the sensing signal $S_{sense}$ at a time t1 so that the preparatory starting device 220 begins performing the starting operation at the time t1, and finishes the starting operation at a time t2 for sending the operation command $S_{operation}$ to the starting unit 230. However, the starting unit 230 does not receive the control signal $S_{control}$ after the predetermined time interval $T_{pred}$ from the time t2, so the starting unit 230 sends a cancel signal $S_{cancel}$ at a time $t_{drop}$ to the preparatory starting device 220 for the preparatory starting device 220 to stop sending the operation command $S_{operation}$ at a time $t_{drop}'$. The preparatory starting device 220 therefore is set as an original state at the time $t_{drop}'$.

Figure 7:
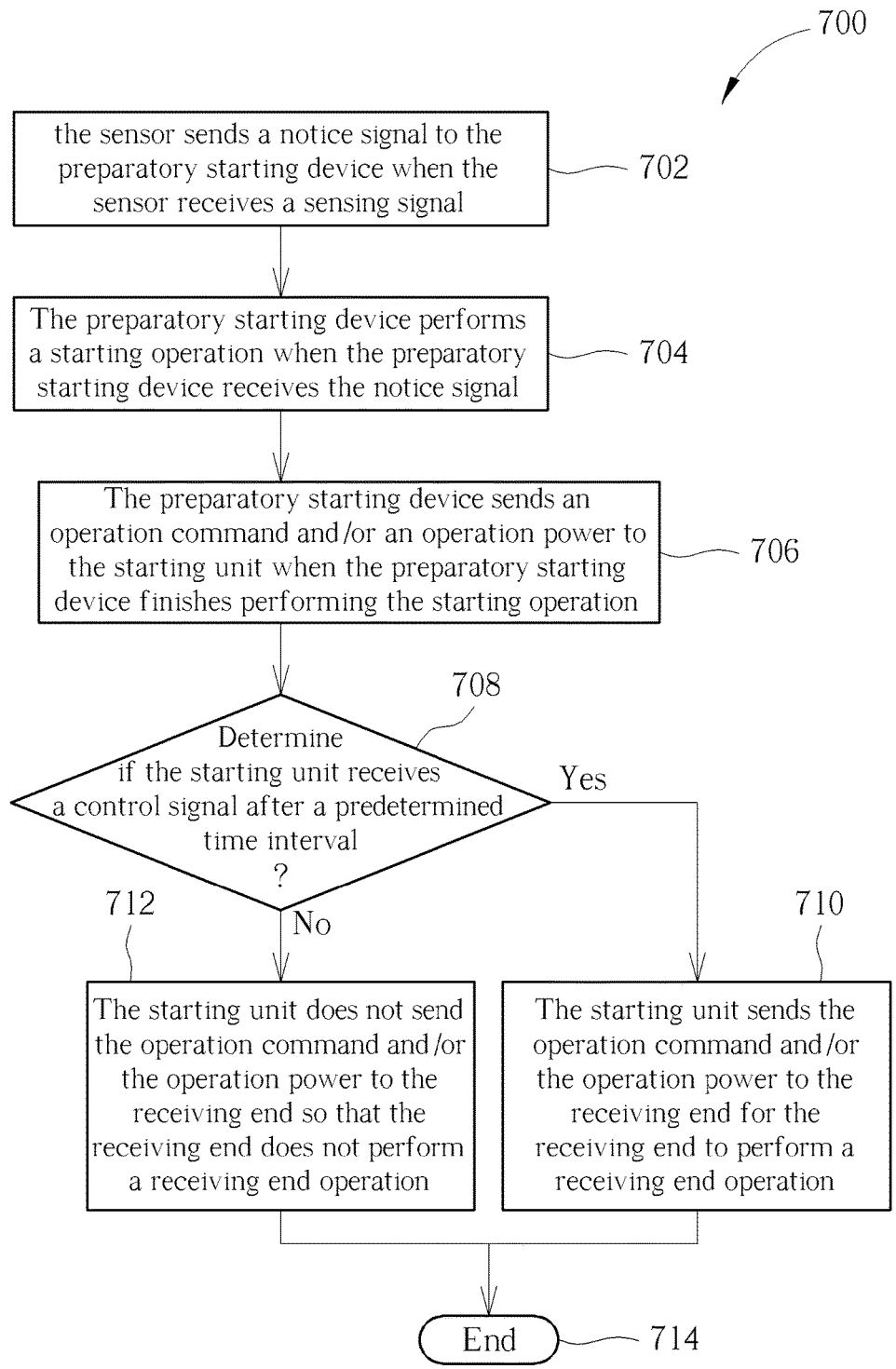
FIG. 7 illustrates a flow chart of a method for controlling the control system shown in FIG. 2.

FIG. 7 illustrates a flow chart of a method 700 for controlling the control system 200 shown in FIG. 2. The method 700 includes the following steps.

Step 702: the sensor 210 sends a notice signal $S_{notice}$ to the preparatory starting device 220 when the sensor 210 receives a sensing signal $S_{sense}$;

Step 704: the preparatory starting device 220 performs a starting operation when the preparatory starting device 220 receives the notice signal $S_{notice}$;

Step 706: the preparatory starting device 220 sends an operation command $S_{operation}$ and/or an operation power $P_{operation}$ to the starting unit 230 when the preparatory starting device 220 finishes performing the starting operation;

Step 708: determine if the starting unit 230 receives a control signal $S_{control}$ after a predetermined time interval? If yes, enter step 710; if no, enter step 712;

Step 710: the starting unit 230 sends the operation command $S_{operation}$ and/or the operation power $P_{operation}$ to the receiving end 240 for the receiving end 240 to perform a receiving end operation; enter step 714;

Step 712: the starting unit 230 does not send the operation command $S_{operation}$ and/or the operation power $P_{operation}$ to the receiving end 240 so that the receiving end 240 does not perform a receiving end operation; and Step 714: end.

Figure 8:
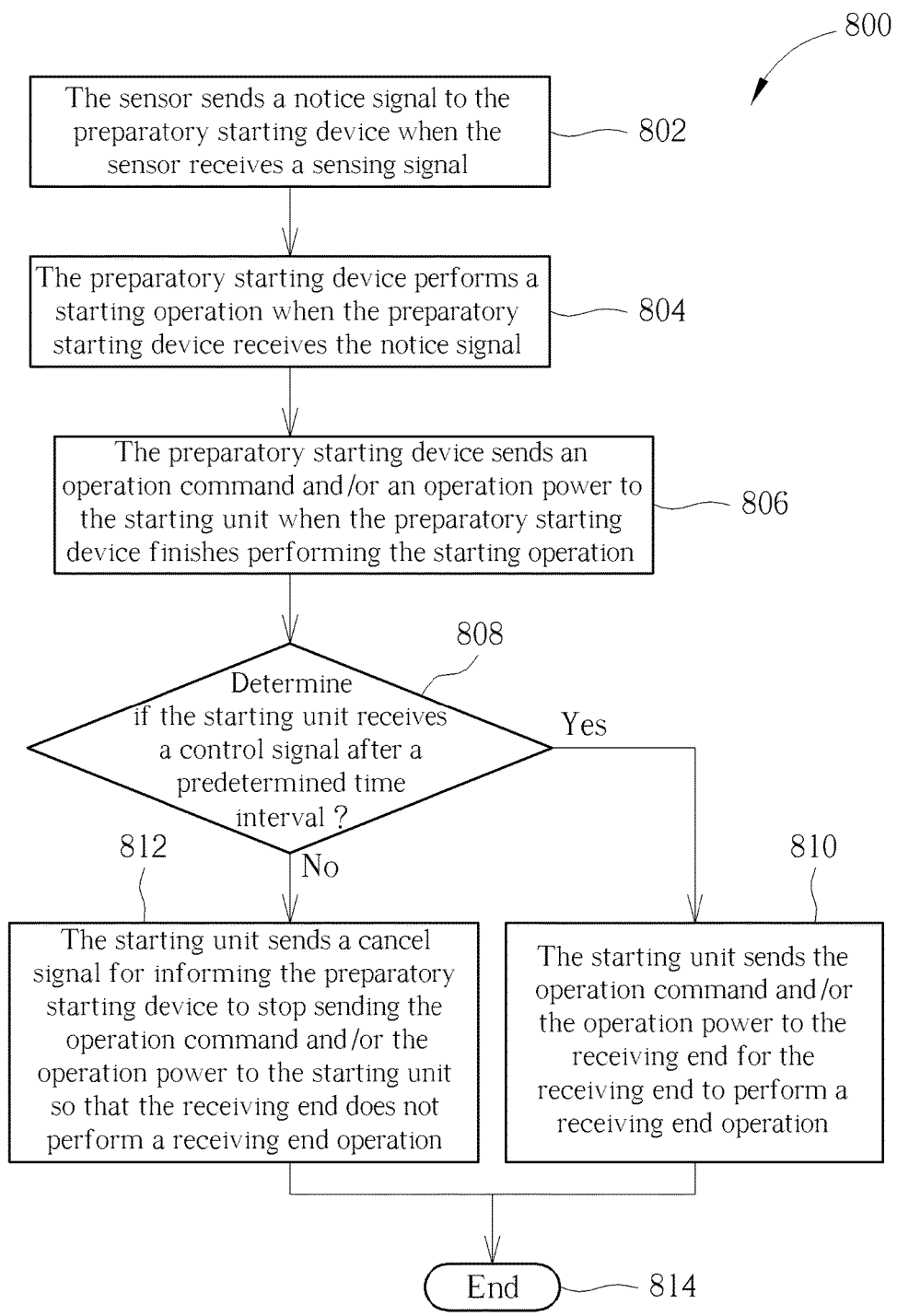
FIG. 8 illustrates a flow chart of another method for controlling the control system shown in FIG. 2.

FIG. 8 illustrates a flow chart of another method 800 for controlling the control system 2 shown in FIG. 2. The method 800 includes the following steps.

Step 802: the sensor 210 sends a notice signal $S_{notice}$ to the preparatory starting device 220 when the sensor 210 receives a sensing signal $S_{sense}$;

Step 804: the preparatory starting device 220 performs a starting operation when the preparatory starting device 220 receives the notice signal $S_{notice}$;

Step 806: the preparatory starting device 220 sends an operation command $S_{operation}$ and/or an operation power $P_{operation}$ to the starting unit 230 when the preparatory starting device 220 finishes performing the starting operation;

Step 808: determine if the starting unit 230 receives a control signal $S_{control}$ after a predetermined time interval Tpred? if yes, enter step 810; if no, enter step 812;

Step 810: the starting unit 230 sends the operation command $S_{operation}$ and/or the operation power $P_{operation}$ to the receiving end 240 for the receiving end 240 to perform a receiving end operation; enter step 814;

Step 812: the starting unit 230 sends a cancel signal $S_{cancel}$ for informing the preparatory starting device 220 to stop sending the operation command $S_{operation}$ and/or the operation power $P_{operation}$ to the starting unit 230 so that the receiving end 240 does not perform a receiving end operation; and Step 814: end.

The abovementioned automatic door control system is merely an embodiment of the present application for demonstrating how the control system 200 operates instead of limiting the scope of the present application. The sensor 210 shown in FIG. 2 may receive the sensing signal $S_{sense}$ wirelessly and/or wiredly. The starting unit 230 shown in FIG. 2 may receive the control signal $S_{control}$ wirelessly or wiredly. The starting unit 230 shown in FIG. 2 may be (but not limited to) a voice controlled switch, a touch controlled switch or a sensor switch. The sensor 210 shown in FIG. 2 may be (but not limited to) an optical sensor, a touch sensor, a proximity sensor, a pressure sensor, a sound sensor, a visual recognition device, a motion sensor, a temperature sensor, a gas sensor, a liquid sensor or a fire alarm sensor. The sensor 210 may communicate with a mobile phone, a tablet computer, a laptop computer, a wearable device, a remote control or a sensor switch. For example, the mentioned sensing signal $S_{sense}$ may be sent to the sensor 210 when a user picks up a mobile phone or an air-conditioner remote control. The described preparatory starting device 220 requires a preparing time to perform the starting operation, and the operation command $S_{operation}$ and/or the operation power $P_{operation}$ is sent only after the starting operation is finished. The preparatory starting device 220 may be (but not limited to) a motor, a compressor, an electrical starter device, a mechanical starter device, a capacitor power-storing device or a voltage transformer device. The operation command $S_{operation}$ may be (but not limited to) a signal pulse signal, a signal with a specific frequency, a signal with a waveform transited to a low level, or a signal with a waveform transited to a high level. The operation power $P_{operation}$ may be (but not limited to) a mechanical power (e.g. pushing power, pulling power, torsion power), an electrical power and/or a magnetic power. In FIG. 3 to FIG. 6, the operation curve of the starting operation performed by the preparatory starting device rising from a low state to high state is to describe the process of the starting operation from start to finish. The described starting operation may be the starting operation requiring a preparing time, which includes (but not limited to) an electrical starting circuit entering an operating status from a non-operating status, a motor increasing its rotational speed to a specific speed, establishing wired/wireless communication among multiple devices (such as establishing handshake protocol among several devices), and a capacitor power-storing device storing an electrical power to a specific level. The receiving end 240 may be (but not limited to) an automatic door, an industrial equipment, an air-conditioning device, a home appliance device, an agriculture control device, a fishery control device, a livestock husbandry control device, a public facility or a monitor alarming device. The sensor 210 may be switched in an action mode and a sleep mode in turn periodically. The sensor 210 may receive the sensing signal $S_{sense}$ in the action mode but does not receive the sensing signal $S_{sense}$ in the sleep mode. For example, by switching the sensor 210 in the action mode for 0.9 second and a sleep mode for 0.1 second in turn periodically, the power-saving effect may be further improved.

Take an automatic door control system for example. According to prior art, an electrical power (corresponding to the operation power $P_{operation}$ shown in FIG. 2) is sent to the starting unit 230 uninterruptedly. When the starting unit 230 does not receive the control signal $S_{control}$ (e.g. a user moving near the automatic door within 50 centimeters), the operation power $P_{operation}$ (e.g. electrical power) is not sent to the receiving end 240 (e.g. an automatic door sheet) so as to open the door. According to prior art, an operation power is provided continuously so that the power consumption is considerable. According to the control system 200 disclosed by an embodiment of the present application, the operation power is not provided continuously, but the operation power is provided only when a user moves close to the sensor 210 within a predetermined distance (e.g. 5 meters) for the sensor 210 to receive the sensing signal $S_{sense}$. When there is no user moving near the control system 200 within the predetermined distance (e.g. 5 meters), the operation power $P_{operation}$ is unneeded to be provided, and only a small power is prepared to keep the sensor 210 operating. Therefore, the control system 200 disclosed by the present application may save more power than prior art. For example, when fewer pedestrians walk by the automatic door using the control system 200, the power-saving effect is more significant. Moreover, when a pedestrian walks close to the automatic door with a purpose to walk in (e.g. when the pedestrian getting close to the automatic door within 50 centimeters), the control system 200 may perform the functional starting operation quickly for performing the receiving end operation quickly so that the automatic door may open promptly. Therefore, the control system 200 disclosed by the present application not only improves user experience but also has good power-saving effect.

In general, a control system consumes the most power when performing a functional operation such as opening an automatic door or rotating a shaft of a fishery machine, hence the control system may save power when the functional operation is not performed. That is to say, by sending the operation command $S_{operation}$ and/or the operation power $P_{operation}$ only to the starting unit 230 but not sending the operation command $S_{operation}$ and/or the operation power $P_{operation}$ to the receiving end 240 before receiving the control signal $S_{control}$, the control system 200 may both save power and reduce the waiting time in comparison with a control system of prior art which does not perform the described preparatory starting operation.

By means of the control system 200, the method 700 and method 800 disclosed by embodiments of the present application, the delay time a user suffers is effectively reduced so that user experience and convenience are improved. For example, when the control system 200 is used in industrial equipment such as a construction machine, reducing the delay time may help a user to control the industrial equipment more intuitively so that the risk of industrial accident is decreased. Hence, the control system and method thereof disclosed by the present application may bring about better power-saving effect, better industrial safety and improved user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control system, comprising:
    a sensor configured to receive a sensing signal and send a notice signal when a user moves to within a predetermined distance from the sensor;
    a preparatory starting device configured to receive the notice signal, perform a preparatory starting operation and send an operation command and/or an operation power;
    a starting unit coupled to the preparatory starting device and configured to receive a control signal, and receive and send the operation command and/or the operation power; and
    a receiving end coupled to the starting unit, and configured to receive the operation command and/or the operation power and perform a receiving end operation;
    wherein after the sensor receives the sensing signal, the sensor sends the notice signal to the preparatory starting device, the preparatory starting device performs the preparatory starting operation, the preparatory starting device sends the operation command and/or the operation power to the starting unit, the starting unit sends the operation command and/or the operation power to the receiving end to perform a functional starting operation for the control system to enter an operation-allowed mode for the receiving end to perform the receiving end operation only when the starting unit receives the control signal; and
    wherein the preparatory starting operation consumes less power than the functional starting operation, and the preparatory starting operation comprises a motor increasing a rotational speed to a specific speed and/or a plurality of devices establishing handshake protocol among one another.

2. The control system of claim 1, wherein the sensor receives the sensing signal wirelessly and/or wiredly.

3. The control system of claim 1, wherein the sensor sends the notice signal wirelessly and/or wiredly.

4. The control system of claim 1, wherein the starting unit receives the control signal wirelessly and/or wiredly.

5. The control system of claim 1, wherein the sensor is an optical sensor, a touch sensor, a proximity sensor, a pressure sensor, a sound sensor, a visual recognition device, a motion sensor, a temperature sensor, a gas sensor, a liquid sensor or a fire alarm sensor.

6. The control system of claim 1, wherein the preparatory starting device comprises the motor, a compressor, an electrical starter device, a mechanical starter device, a capacitor power-storing device or a voltage transformer device.

7. The control system of claim 1, wherein the receiving end is an automatic door, an industrial equipment, an air-conditioning device, a home appliance device, an agriculture control device, a fishery control device, a livestock husbandry control device, a public facility or a monitor alarming device.

8. The control system of claim 1, wherein the starting unit is a voice controlled switch, a touch controlled switch or a sensor switch.

9. The control system of claim 1, wherein the sensor is switched into an operating mode and a sleep mode by turns periodically, the sensor receives the sensing signal in the operating mode, and the sensor does not receive the sensing signal in the sleep mode.

10. A method for controlling a control system, the control system comprising a sensor, a preparatory starting device, a starting unit and a receiving end, the method comprising:
    the sensor sending a notice signal to the preparatory starting device when the sensor receives a sensing signal when a user moves to within a predetermined distance from the sensor;
    the preparatory starting device performing a preparatory starting operation when the preparatory starting device receives the notice signal;
    the preparatory starting device sending an operation command and/or an operation power to the starting unit when the preparatory starting device finishes performing the starting operation; and
    the starting unit sending the operation command and/or the operation power to the receiving end for the receiving end to perform a functional starting operation for the control system to enter an operation-allowed mode for the receiving end to perform a receiving end operation only when the starting unit receives a control signal;
    wherein the preparatory starting operation consumes less power than the functional starting operation, and the preparatory starting operation comprises a motor increasing a rotational speed to a specific speed and/or a plurality of devices establishing handshake protocol among one another.

11. The method of claim 10, further comprising the starting unit not sending the operation command and/or the operation power to the receiving end so that the receiving end does not perform the receiving end operation when the starting unit does not receive the control signal after a predetermined time interval.

12. A method for controlling a control system, the control system comprising a sensor, a preparatory starting device, a starting unit and a receiving end, the method comprising:
    the sensor sending a notice signal to the preparatory starting device when the sensor receives a sensing signal when a user moves to within a predetermined distance from the sensor;
    the preparatory starting device performing a preparatory starting operation when the preparatory starting device receives the notice signal;
    the preparatory starting device sending an operation command and/or an operation power to the starting unit when the preparatory starting device finishes performing the starting operation;
    the starting unit informing the preparatory starting device to stop sending the operation command and/or the operation power to the starting unit and the receiving end not performing a functional starting operation when the starting unit does not receive a control signal after a predetermined time interval;

wherein the functional starting operation is for the for the control system to enter an operation-allowed mode for the receiving end to perform the receiving end operation, and the preparatory starting operation consumes less power than the functional starting operation, and the preparatory starting operation comprises a motor increasing a rotational speed to a specific speed and/or a plurality of devices establishing handshake protocol among one another.

\* \* \* \* \*